United States Patent
Zou et al.

(10) Patent No.: US 8,211,969 B2
(45) Date of Patent: Jul. 3, 2012

(54) DISPERSIONS OF CARBON NANOTUBES IN COPOLYMER SOLUTIONS AND FUNCTIONAL COMPOSITE MATERIALS AND COATINGS THEREFROM

(75) Inventors: Jianhua Zou, Orlando, FL (US); Lei Zhai, Oviedo, FL (US); Qun Huo, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 578 days.

(21) Appl. No.: 12/249,859

(22) Filed: Oct. 10, 2008

(65) Prior Publication Data

US 2009/0118420 A1 May 7, 2009

Related U.S. Application Data

(60) Provisional application No. 60/978,881, filed on Oct. 10, 2007.

(51) Int. Cl.
*B29C 41/00* (2006.01)
*B32B 27/00* (2006.01)
*B32B 27/18* (2006.01)
*C08K 3/04* (2006.01)
*C09K 7/02* (2006.01)
*C08F 291/14* (2006.01)
*C08F 279/00* (2006.01)
*C08F 236/04* (2006.01)
*C08F 236/20* (2006.01)
*C08G 81/00* (2006.01)
*C08G 75/02* (2006.01)

(52) U.S. Cl. ..... 524/496; 264/298; 264/299; 428/497.4; 524/495; 524/847; 525/535; 528/377; 528/379; 528/380; 977/742; 977/753

(58) Field of Classification Search ............... 428/220; 524/457, 458, 460, 461, 496, 495, 534, 547, 524/548, 550, 555, 556; 525/410, 417, 535, 525/536; 528/73, 377, 378, 379
See application file for complete search history.

(56) References Cited

U.S. PATENT DOCUMENTS 6,602,974 B1 * 8/2003 McCullough et al. ......... 528/73
(Continued)

OTHER PUBLICATIONS

Yung-Hoon Ha, et al., "Towards a Transparent Highly Conductive Poly (3,4-ethylenedioxythiophene)", Advanced Functional Materials, 2004, 14, No. 6, June, pp. 615-622, WILEY-VCH Verlag GmbH & Co. KGaA, Weinheim.

(Continued)

*Primary Examiner* — Ling Choi
*Assistant Examiner* — Darcy D Laclair
(74) *Attorney, Agent, or Firm* — Jetter & Associates, P.A.

(57) ABSTRACT

A dispersion includes non-chemically modified carbon nanotubes, a soluble block copolymer providing at least one block of a conjugated polymer and at least one block of a non-conjugated polymer, and at least one solvent. At 25° C. exclusive of any mechanical force and after one hour, at least 90% of the carbon nanotubes exist in the dispersion as isolated carbon nanotubes. The components of the dispersion can be combined with a polymer miscible with the block copolymer to form a carbon nanotube polymer composite upon removal of the solvent. The dispersion can be cast on a substrate and then dried to form a coating, including forming a superhydrophobic coating on the substrate. The non-conjugated polymer of the block copolymer or another miscible conjugated polymer including a copolymer can include functionalities that non-covalently attach to the carbon nanotube surface, such as for enhanced solubility or enhanced biocompatibility.

22 Claims, 9 Drawing Sheets

U.S. PATENT DOCUMENTS

| | | | |
|---|---|---|---|
| 6,762,238 B1* | 7/2004 | Yang et al. | 524/543 |
| 2003/0088032 A1* | 5/2003 | Luebben et al. | 525/410 |
| 2006/0062983 A1* | 3/2006 | Irvin et al. | 428/220 |
| 2006/0076050 A1* | 4/2006 | Williams et al. | 136/263 |

OTHER PUBLICATIONS

Frank Louwet, et al., "PEDOT/PSS: synthesis, characterization, properties and applications", El Sevier, Synthetic Materials, 135-136 (2003) pp. 115-117, AGFA-Gavaert N.V., R&D Materials, Septestraat 27. B-2640 Mortsel, Belgium.

L.A. Majewski, et al., "Influence of processing conditions on the stability of poly(3-hexylthiophene)-based field-effect transistors", American Institute of Physics, Applied Physics Letters, 88, pp. 222108-1 to 222108-3 (2006).

Jinsong Liu, et al., "Tuning the Electrical Conductivity and Self-Assembly of Regioregular Polythiophene by Block Copolymerization: Nanowire Morphologies in New Di- and Triblock Copolymers", Angew. Chem. Int. Ed., 2002, 41, No. 2, pp. 329-332.

Biswajit Ray, et al., "Performance improvement of Polymer Based Solar Cell by Ordered Nano-Morphology", 2010 18th Biennial University/Government/Industry Micro/Nano Symposium (UGIM), West Lafayette, IN, Jul. 15, 2010.

Abigail Wacher, "A Radiation Model of a Rapid Thermal Processing System", Simon Fraser University. 1997, A Thesis Submitted in Partial Fullfillment of the Requirements for the Degree of Master of Science in the Faculty of Graduate Studies, Institute of Applied Mathematics, Department of Mathematics, The University of British Columbia, Feb. 2001.

G. Yu, et al., "Polymer Photovoltaic Cells: Enhanced Efficiencies via a Network of Internal Donor-Acceptor Heterojunctions", Science, vol. 270, pp. 1789-1791, Dec. 15, 1985.

Biswajit Ray, et al., "Performance improvement of polymer Based Solar Cell by Ordered Nano-Morphology", 2010 18th Biennial University/Government/Industry Micro/Nano Symposium (UGIM), West Lafayette, IN Jul. 15, 2010.

* cited by examiner

DISPERSIONS OF CARBON NANOTUBES IN COPOLYMER SOLUTIONS AND FUNCTIONAL COMPOSITE MATERIALS AND COATINGS THEREFROM

CROSS REFERENCE TO RELATED APPLICATION

This application claims the benefit of Provisional Application Ser. No. 60/978,881 entitled "Dispersions of Carbon Nanotubes in Block Copolymer And Superhydrophobic Materials Therefrom", filed Oct. 10, 2007, which is herein incorporated by reference in its entirety.

FEDERAL RIGHTS

The U.S. Government has certain rights to embodiments of the present invention based on National Science Foundation CAREER awards (DMR 0746449, DMR 0552295 and ECCS 0748091), and NIRT award (DMI 0506531).

FIELD OF THE INVENTION

The invention pertains to methods for dispersing carbon nanotubes in block copolymers and dispersions, electrically conductive composites and functional materials therefrom, and devices comprising surface coatings that comprise electrically conductive carbon nanotube/block copolymer comprising composites.

BACKGROUND

Despite many of good electrical, mechanical and optical properties of carbon nanotubes (CNTs), applications for CNT's are still generally limited. One of the main challenges faced for the development of CNT-based materials is the dispersion and stabilization of CNTs in a solvent media. CNTs generally form bundles due to strong van der Waals interactions between the respective nanotubes. Known methods to disperse CNT's into solvents and polymer matrices include direct mixing, chemical functionalization and third component-assisted dispersion. Each of these methods provide certain advantages and certain disadvantages.

Exfoliation, using mechanical forces such as sonication, although simple and cost effective, generally results in poor quality dispersions. Nanotubes dispersed in this manner quickly (e.g. within several minutes) precipitate from suspension or solution when the mechanical force stops.

Chemical modification and functionalization of CNTs generally involves treatment with a strong oxidizing acid, such as nitric acid, to form functional groups, such as carboxylic acid groups on the walls of the nanotube. Modification is obtained by breaking carbon-carbon double bonds of the CNTs and turning them into functional groups, such as COOH groups in the case of strong acid treatment. In this manner CNTs can be made sufficiently polar to become water soluble or, upon modification of the carboxylic acid groups, soluble in certain organic liquids. Although chemical modification is generally effective as a dispersion method, such treatment inherently disrupts the long range $\pi$t conjugation of the nanotube, resulting in diminished electrical conductivity, mechanical strength, and/or a degradation in other properties.

Third component-assisted dispersion is currently considered to be the most effective approach. Surfactants molecules such as sodium dodecyl sulfate (SDS), water soluble block copolymers, DNA, proteins, and polyelectrolytes can be used as the third component. These third components are primarily aimed at forming CNT dispersions in aqueous solutions. Recently, conjugated conducting polymers have attracted much attention as dispersants for CNTs. Conjugated polymers are polymers with SP2 hybridized linear carbon back bones. A wide variety of conjugated conducting polymers such as poly(m-phenylene vinylene), poly(3-alkylthiophene), and poly(arylene ethynylene) have been shown to be effective for dispersing CNTs. The dispersion effect is attributed to the $\pi$-$\pi$ interactions between the conjugated conducting polymers and the CNTs. However, such $\pi$-$\pi$ interactions limit the solubility of the conjugated polymers in solvents and such CNT-conjugated polymers are generally immiscible with other polymer systems.

Hence, there remains a need for stable CNT dispersions or solutions, particularly in non-aqueous solutions, where the desired properties (e.g. electrical and mechanical) of the nanotubes are not compromised by reactions that can alter their surfaces, and where little or no aggregation of the nanotubes are present in the dispersion, and the dispersion remains stable for significant lengths of time, such as weeks or months. Stable CNT dispersions or solutions would also be useful to form composite materials and to develop new coatings for use in a variety of technologies and applications.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims. In a first embodiment of the invention, a carbon nanotube comprising dispersion comprises a block copolymer comprising at least one block of a conjugated polymer and at least one block of a non-conjugated polymer, at least one solvent for dissolving the block copolymer to form a solution; and a plurality of non-chemically modified carbon nanotubes (CNTs) dispersed in the solution. The solvent can comprise an organic solvent, such as chloroform, toluene, or tetrahydrofuran. At 25° C. exclusive of any mechanical force after one hour at least 90% of the plurality of CNTs exist in the dispersion as isolated CNTs.

As used herein, the phrase "non-chemically modified CNTs" refers to CNTs that have an outer surface that is essentially exclusive of carbon atoms bonded to other species that result from breaking the carbon-carbon SP2 ($\pi$-$\pi$) bonds on the CNT surface. Thus, in embodiments of the invention, modification of surface of the non-chemically modified CNTs is achieved by delivering existing functional groups to CNT surfaces via the non-conjugated block in the block copolymer. In contrast, in conventional approaches, strong oxidants such as peroxides or strong acids such as nitric acid are used to break the carbon-carbon bonds on the CNT surface and turn them into polar groups, such as COOH groups.

In another embodiment of the invention, the non-conjugated polymer can comprise various functional groups that non-covalently associate with the CNT surfaces to maintain the non-chemically modified CNTs while manipulating CNT's properties, such as, but not limited to, solubility and biocompatibility. In one specific example, the conjugated polymer (e.g. Poly(3-hexylthiophene)=P3HT) block non-covalently attaches to CNT surface through $\pi$-$\pi$ interactions, whereas the non-conjugated polymer (e.g. polyacrylic acid=PAA) block with a tunable composition locates at the surface of CNTs to provide the CNT's with different functionalities (e.g. COOH). As used herein, non-covalently attached refers to one or more weak interactions that do not involve covalent bonds, such as π-π interactions, van der Waals interactions, and static charge interactions.

DETAILED DESCRIPTION OF THE INVENTION

Figure 1A:
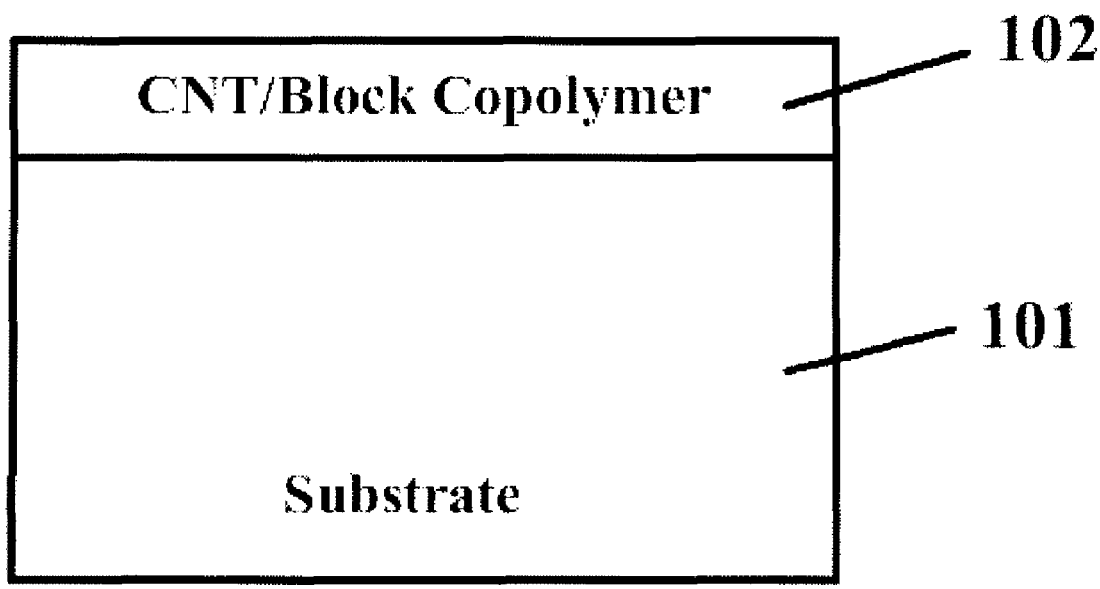
FIG. 1(a) shows a cross sectional view of a coated substrate comprising a substrate and a CNT/block copolymer comprising coating thereon, according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

One embodiment of the present invention is directed to a dispersion or solution of non-chemically modified carbon nanotubes (CNTs) including at least one solvent and a block copolymer comprising at least one block of a conjugated polymer and at least one block of a non-conjugated polymer as the dispersing and stabilization agent. At 25° C. exclusive of any mechanical force, after one hour at least 90% of the plurality of carbon nanotubes exist in the dispersion as isolated nanotubes. The CNTs, can comprise either single-wall CNT's (SWNTs), multiwall CNTs (MWNTs), or mixtures thereof. The conjugated polymer segments are adapted to associate with the nanotubes via π-π interactions to overcome the van der Waals interactions between combinations of nanotubes that would otherwise bundle the CNTs, permitting their dispersion in the presence of the block copolymer and a suitable solvent for the non-conjugated block of the copolymer. Embodiments of the present invention are also directed to composites and coatings derived from the CNT dispersions (e.g. after drying).

The concentration of CNTs in the dispersion generally ranges from 0.2 to 5 mg/mL, and the weight ratio between CNTs and the conjugated block copolymers generally ranges so that the weight ratio between CNTs and conjugated polymer block is from 1:0.2 to 1:25.

In embodiments of the invention, the dispersing agent is generally the block copolymer. As used herein, the block copolymer can be a diblock copolymer, triblock copolymer, multiblock copolymer or graft copolymer where one or more conjugated blocks are grafts on a non-conjugated polymer block or one or more non-conjugated blocks are grafts on a conjugated polymer block. In general, but not necessarily, the number of conjugated blocks is restricted to few in number, generally one or two, such that a physical cross-linking of tri, multi and multi graph copolymers by CNTs is inhibited. The necessity to restrict the number of conjugated blocks to one or two will generally depend on the binding constants of the individual conjugated blocks with the nanotubes, the relative proportions of block copolymers to nanotubes, the size of the conjugated and non-conjugated blocks, the relative size of the conjugated and non-conjugated blocks, and the size of the nanotubes. With appropriate combinations of factors, there are generally no limitations to the number of conjugated blocks on the copolymer. Dendrimers with a single or only a few conjugated blocks on the periphery are generally useful copolymers for an embodiment of the invention. The molecular weight distribution of the block copolymers and of the individual blocks in the block copolymer can be narrow ($M_w M_n \leq 1.8$), about normal ($M_w M_n = 1.9$ to 2.1) or broad ($M_w M_n \geq 2.2$), wherein Mw is the weight average molecular weight and Mn is the number average molecular weight, as defined below:

Number average $MW$ $(\overline{M}_n) = \Sigma(M_i N_i)/\Sigma(N_i)$

Weight average $MW$ $(\overline{M}_w) = \Sigma(M_i^2 N_i)/\Sigma(M_i N_i)$

When multiblock or multi graft polymers are used, the molecular weight distributions can be very large.

The conjugated block polymer can be, for example, polythiophene, polypyrrole, polydioxythiophene, polydioxypyrrole, polyfluorene, polycarbazole, polyfuran, polydioxyfuran, polyacetylene, poly(phenylene), poly(phenylenevinylene), poly(arylene ethynylene), polyaniline, polypyridine, polyfluorene and any of these polymers that have substitutions such as alkyl, alkenyl, alkynyl, alkoxy, aryl, aryloxy, halogen, ester, or amide. The substituents can be chiral or achiral. The conjugated polymer can be a copolymer, for example having the same base conjugated repeating unit but different substituents on different repeating units or different conjugated repeating units. The conjugated polymers with substituents can be regio or stereo regular or regio or stereo random. The degree of polymerization of the conjugated block can generally range from 2 to about 1,000 depending upon the specific blocks ability to form sufficiently strong and stable interactions with the CNTs in the presence of the dispersing solvent.

The non-conjugated polymer blocks can be common step-growth or chain-growth polymers that can be coupled with, grafted to, grafted on, initiate, or terminate a conjugated polymer to form the desired conjugated-block-non-conjugated polymer as long as the non-conjugated polymer is readily dissolved in one or more solvents or a mixture of solvents. The individual non-conjugated polymer block can be linear or branched. The polymers can generally range from stereoregular (tactic) or stereorandom (atactic). When possible the non-conjugated polymer can be regioregular (head to head or head to tail) or regiorandom. The non-conjugated branch can be a copolymer of two or more monomers. Among polymers that can be used for the practice of embodiments of the inventions include polystyrene, polyacrylates (such as polymethylacrylate), polymethacrylates (such as polymethylmethacrylate) polydienes (such as polybutadiene), polyalkyleneoxides (such as polyethyleneoxide), polyvinylethers, polyalkylenes, polyesters, polycarbonates, polyamides, polyurethanes, polyvinylpyrrolindone, polyvinylpyridine, polysiloxanes, polyacrylamide, epoxy polymers, and fluorinated variations of these polymers. The degree of polymerization of the non-conjugated block polymer can generally range from about 20 to about 1,000,000.

A variety of solvents that are chemically inert towards the nanotubes, such that CNT bonding remains unaltered, can be used for the practice of embodiments of the invention. Generally, but not necessarily, it is also desirable that the solvent is generally inert with respect to the copolymer. Generally, the solvent is chosen by the solubility of the non-conjugated block of the block copolymer. Other factors that may be considered in the selection of the solvent depend upon the intended use of the CNT-conjugated-block-non-conjugated copolymer. Typically, the CNT dispersion can be prepared by a relatively gentle sonication of CNTs in the presence of a conjugated-block-non-conjugated copolymer solution.

In one embodiment of the invention, the CNT-block copolymer dispersion can be used to prepare CNT polymer composites. Using a polymer that is identical to or miscible with the non-conjugated polymer in the block copolymer permits a dispersion of the CNT block copolymer in the polymer. Generally the dispersion will be formed by mixing a solution of the polymer with the CNT block copolymer dispersion. The composite can be formed upon the removal of the solvent. By controlling the proportions of the CNT-block copolymer and the polymer, the level of CNT's in the composite can be controlled. The quality of the dispersion of the CNT-block copolymer of an embodiment of the invention can be so high that CNTs can be dispersed in the polymer matrix nearly individually (e.g. at least 90%) such that the composite can be rendered electrically conductive at a very low level of CNTs, such as evidenced by an extremely low percolation threshold for electrical conductance, as low as 0.03%, or even less.

Figure 4:
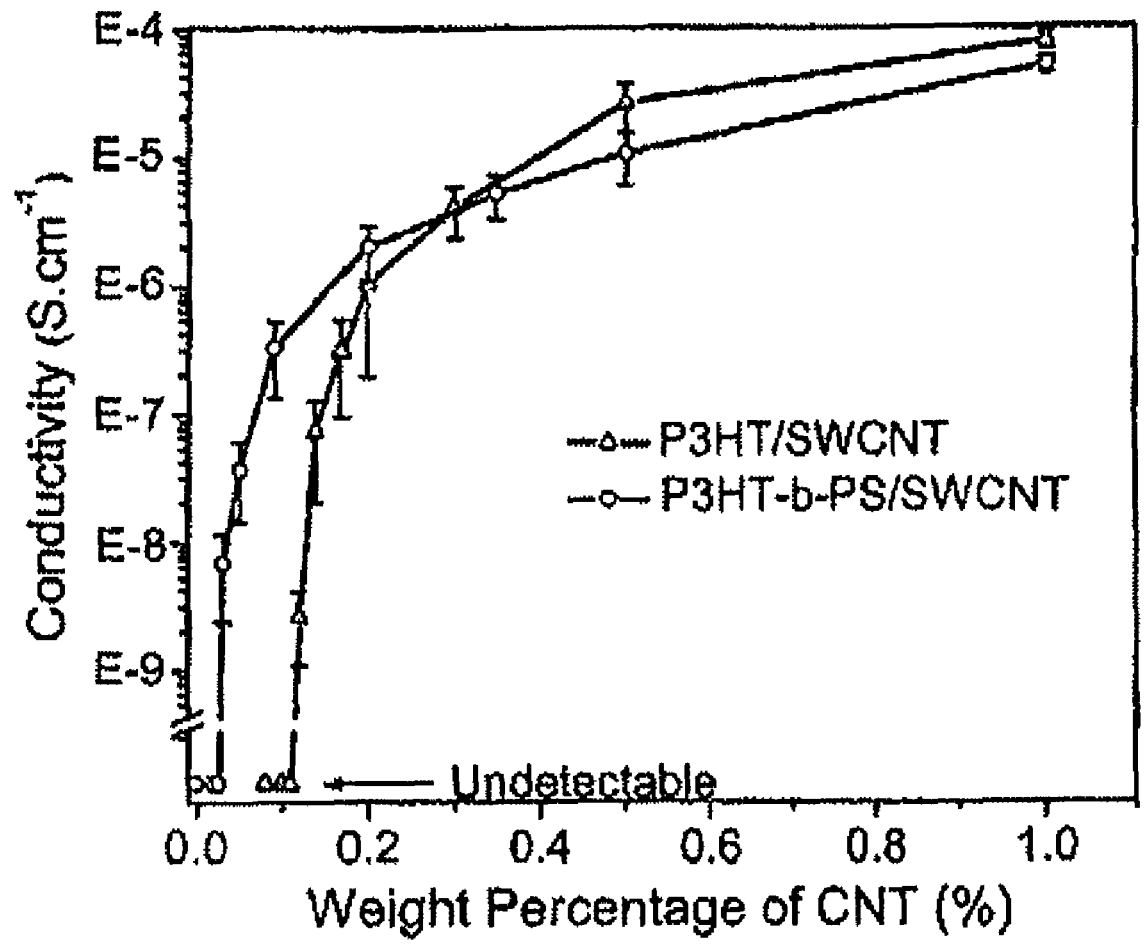
FIG. 4 are plots of the electrical conductivities of P3HT-b-PS/SWCNT and P3HT/SWCNT nanocomposites in PS matrices versus the weight percent of SWCNTs, according to an embodiment of the invention.

As used herein, the percolation threshold for electrical conductance is the CNT concentration threshold in which the electrical conductance of the composite rises in a discontinuous fashion to a higher level, and thus evidences the critical threshold in which long-range connectivity of CNTs is first established (See FIG. 4 described below). The percolation threshold thus corresponds to the lowest CNT filler loading level where a significant conductivity increase for the composite is observed. The loading ratio has been used as an indicator of CNT dispersion quality in the polymer matrix. Generally, lower percolation thresholds are observed for higher quality nanotube dispersions in polymer matrices.

FIG. 1(a) shows a cross sectional view of a coated substrate 100 comprising a substrate 101 and a CNT/block copolymer comprising composite coating 102 thereon, according to an embodiment of the invention. Coated substrate can be formed by casting a dispersion according to an embodiment of the invention on the surface of substrate 101, and then evaporating the solvent. The thickness of the coating generally ranges from 0.1 µm to 200 µm. The substrate can comprise a variety of materials, including metals, semiconductors and dielectrics (e.g. glasses), woods, fibrics, and plastics. Although not shown, the coating may be patterned, such as by using lithography techniques and ink jet techniques. The composite materials can generally contain 0.1 to 99.9 weight percent of CNTs, 0.1 to 99.9 weight percent conjugated polymer and 0.1 to 99.9 weight percent non conjugated polymer.

Figure 1B:
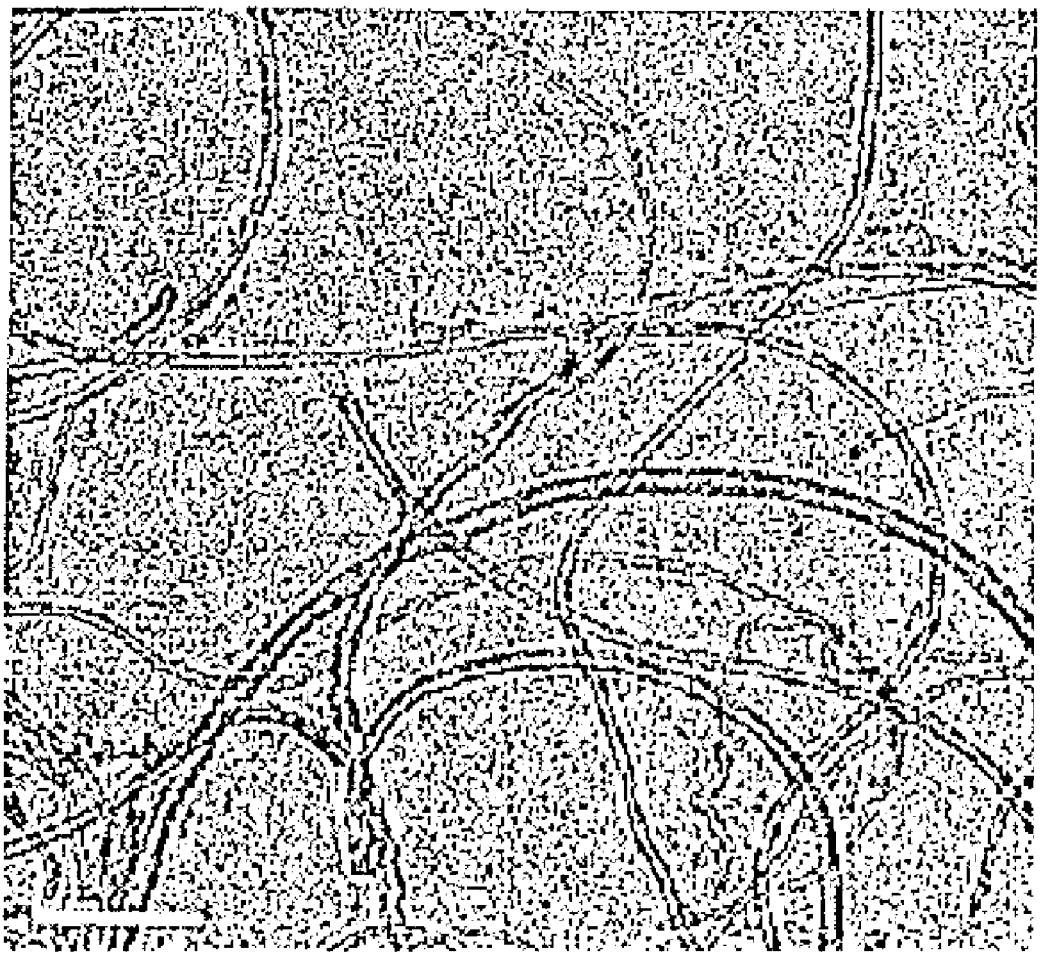
FIG. 1(b) is a depiction derived from a transmission electron microscope (TEM) image of P3HT-b-polystyrene(PS)/MWCNT (1:1) dispersion, the scale bar being 100 nm, according to an embodiment of the invention.
Figure 1C:
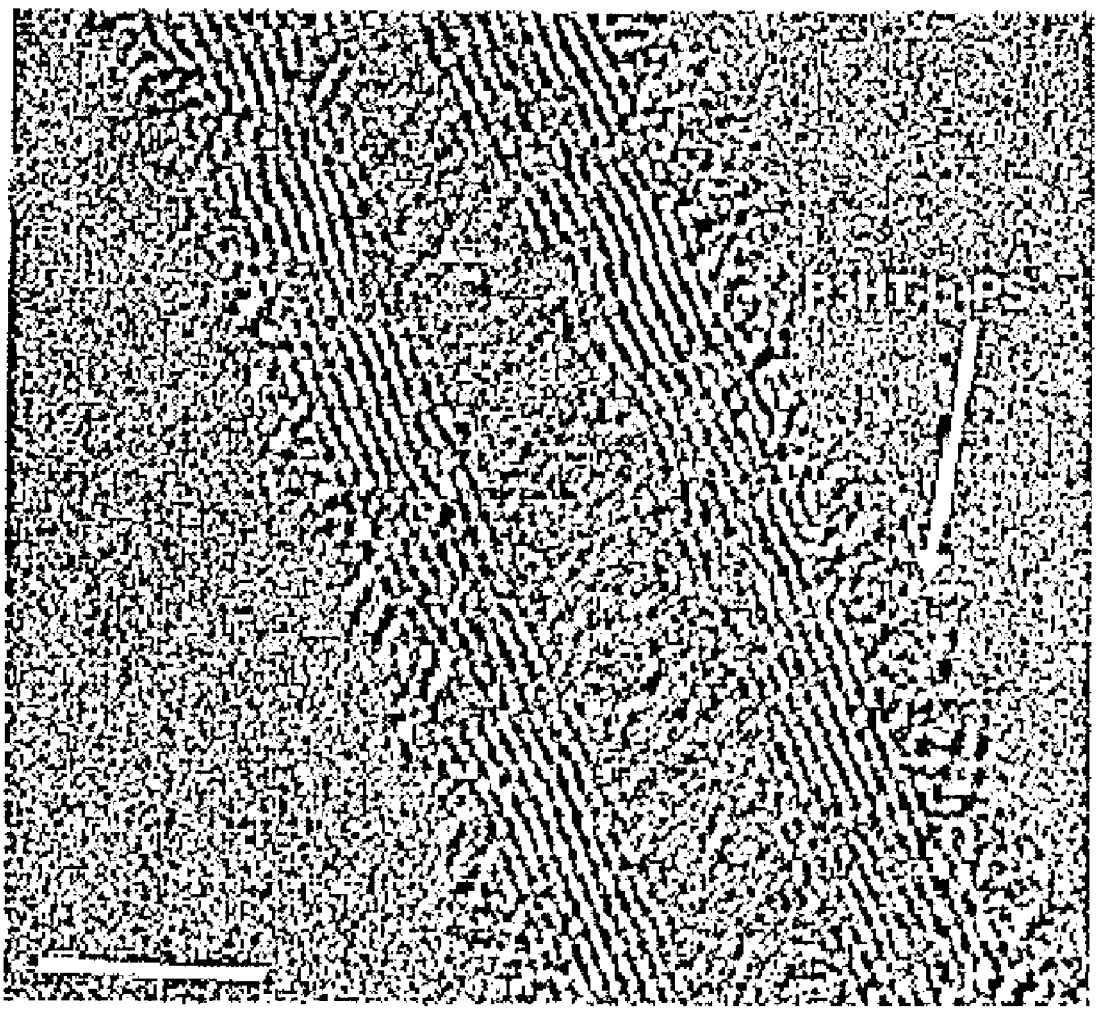
FIG. 1(c) is a depiction derived from a TEM of a single MWCNT covered by a thin layer of P3 HT-b-PS, the scale bar being 5 nm, according to an embodiment of the invention.

FIG. 1(b) is a depiction derived from a transmission electron microscope (TEM) image of P3HT-b-PS/MWCNT (1:1) dispersion, the scale bar being 100 nm, according to an embodiment of the invention. Almost all (>90%) of the MWCNTs can be seen to reside in the dispersion as isolated (i.e. not bundled) nanotubes. FIG. 1(c) is a depiction derived from a TEM of a single MWCNT covered by a thin layer of P3HT-b-PS, the scale bar being 5 nm, according to an embodiment of the invention. A thin amorphous coating layer of P3HT-b-PS with a thickness of about 2 nm can be seen on the surface of an outer wall of the MWCNT.

The high electrically conductivity aspect of composites according to embodiments of the invention make coatings of such materials generally appealing for a variety of applications. Such applications include, but not limited to, piezoelectric actuators and power generators (e.g. CNT/polyvinylidene difluoride composites), organic photovoltaics, ultra-thin lithium ion batteries, supercapacitors and ultra-thin electromagnetic bandgap (EBG) absorbers.

In one embodiment of the invention, superhydrophobic coatings are formed by drying certain CNT/block copolymer dispersions according to embodiments of the present invention as described in the Examples below. A super-hydrophobic surface is generally defined in the art and is defined herein as a surface which provides a contact angle greater than 150° with a drop of water at normal ambient temperatures (about 25° C.). Due to unexpected segregation effects during drying for certain CNT/block copolymer dispersions, the base portion of the superhydrophobic coating was found comprises primarily (such as at least 90% by weight) the CNTs and a top portion of the superhydrophobic coating comprises micro- and nanostructural features that comprise primarily ((such as at least 90% by weight) the block copolymer. In this embodiment, the block copolymer can comprise poly(3-hexylthiophene-block-polystyrene). The resulting micro- and nanostructural features combined with the high electrical conductivity of superhydrophobic surfaces according to embodiments of the invention (e.g. 10 to 1,000 S/cm) make these materials appealing for a variety of applications, including, but not limited providing electromagnetic interference shielding properties to a substrate, or sensors that are free of moisture interference, such as gas sensors on a substrate.

In yet another embodiment of the invention, the non-conjugated polymer provided by the block copolymer can comprise various functional groups that non-covalently associate with the CNT surfaces to manipulate CNT properties, such as solubility and biocompatibility. As described above, "non-covalently attached" refers to one or more weak interactions that do not involve covalent bonds, such as π-π interactions, van der Waals interactions, and static charge interactions.

These embodiments provide a simple and versatile approach to disperse and functionalize CNTs in a single step process using conjugated polymer comprising block copolymers. The conjugated block (e.g. P3HT) will bind to the CNT surfaces through non-covalent π-π interactions, and help prevent CNTs from aggregating, while the non-conjugated block with various functionalities on CNT surfaces will introduce a variety of function groups to CNTs. This approach can readily improve the CNT properties such solubility and biocompatibility, provide functional groups for further functionalization, and retain the original structures and properties of non-chemically modified CNTs. The functionality of CNT can be controllable by selecting different conjugated block polymers, and varying the relative amount of the functional non-conjugated polymers.

In a first exemplary embodiment, CNT surfaces are functionalized while remaining non-chemically modified CNTs with carboxylic acids by dispersing and functionalizing non-chemically modified CNTs with a suitable copolymer, such as P3HT-b-PAA block copolymers. A good dispersion of MWCNT can be obtained by sonicating CNTs and P3HT-b-PAA in tetrahydrofuran (THF). According to a mechanism believed to be operable, P3HT blocks attach to the surface of CNT through π-π interactions, while the PAA blocks locate at the surface of CNTs and functionalize the CNTs with carboxylic groups, without chemically modifying the CNTs.

Applicants present certain theoretical aspects below that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

The as-obtained CNTCOOH was characterized by a transmission electron microscope (TEM). The TEM images obtained revealed well dispersed CNTs with high aspect ratios. Since the P3HT-b-PAA block copolymers bond with CNTs through non-covalent π-π interactions, and a short time sonication is applied for the dispersing process, the chemical structure, electric and mechanical properties of CNTs are maintained. High resolution TEEM image of CNTCOOH revealed that the CNTs are covered homogenously with P3HT-b-PAA. The homogenous and non-specific coverage of CNT by P3HT-b-PAA ensures the uniform distribution of carboxylic groups on CNT surfaces.

The density of carboxylic group on functionalized CNTs was found to be controllable by varying the composition of P3HT-b-PAA. P3HT-b-PAAs with P3HT to PAA molar ratio of 1:6.8 and 1:0.9 can be synthesized and applied to disperse CNTs in THF. Free P3HT-b-PAA in the dispersion can be removed by three cycles of centrifugation and re-dispersing in THF.

The dispersed CNT-COOH can be finally collected by centrifugation and dried in vacuum. The carboxylic group density of the obtained CNT-COOH was characterized by the titration with NaOH, and was determined to be 7.5 mmol/g and 1.2 mmol/g for the P3HT-b-PAA with the P3HT to PAA ratio of 1:6.8 and 1:0.9, respectively. Therefore, dispersing and functionalizing CNTs using P3HT-b-PAA block copolymers can not only introduce carboxylic groups onto CNT surfaces but also provide uniform distribution of carboxylic groups on CNT surfaces with controlled density.

As noted above, one embodiment of the invention comprises functional groups that non-covalently associate with the CNT surfaces to manipulate CNT solubility. CNTs with good solubility in a variety of solvents are desirable for different applications. In this embodiment, CNTs can be obtained by surface modification with conjugated block polymers with an amphiphilic non-conjugated block. Amphiphilic polymers are polymers which are soluble both in polar solvents and non-polar solvents and will thus anchor on CON surfaces and grant the CNTs solubility in a variety of solvents that would not be solvents for CNTs alone. To demonstrate this idea, a conjugated block copolymer with an exemplary amphiphilic block-comprising P3HT-b-poly (poly (ethylene glycol) methyl ether acrylate) (P3HT-b-PPEGA) was synthesized. MWCNT was first dispersed by P3HT-b-PPEGA in chloroform, and chloroform was then removed to obtain a solid product. The solubility of the P3HT-b-PPEGA dispersed MWCNT was tested by redispersing the solid product in various solvents. In comparison, the solubility of P3HT dispersed MWCNT was also tested. The P3HT dispersed MWCNT is soluble in chloroform, but not soluble in toluene, methanol, ethanol, dimethylformamide (DMF), acetonitrile, or water. In contrast, P3HT-b-PPEGA dispersed MWCNT is soluble in various solvents including chloroform, toluene, methanol, ethanol, DMF, and acetonitrile. All these solvents are good solvents for the PPEGA block, indicating that the solubility of CNTs can be manipulated by the PPEGA block.

As noted above, one embodiment of the invention comprises biocompatible polymers that render the CNTs more biocompatible. Various biological applications of CNTs such as vehicles for drug delivery, DNA and protein delivery, cancer cell destruction agents, and cell imaging and labeling tags have been extensively investigated. However, it is known that both MWCNT and SWCNT are cellular toxic. Therefore, reducing the cytotoxicity and increasing the biocompatibility of CNTs is an important step for establishing their biological applications.

Surface modification of CNT with exemplary biocompatible polymers such as poly (∈-caprolactone) has been found by the present inventors to be an efficient approach to reduce the cytotoxicity of CNT's. One way to attach biocompatible polymers such as poly (∈-caprolactone), polyethylene glycol, poly(2-hydro-oxyethyl methacrylate), polysiloxane, polyhydroxyalkanoate, polylactides, onto CNT surfaces by using conjugated polymer comprising block copolymers, such as P3HT-b-poly (∈-caprolactone) (P3HT-b-PCL as dispersants. It is believed the PCL block anchors to CNT surface through the interaction of the conjugated (e.g. P3HT) block with the CNTs.

To test the cytotoxicity of P3HT-b-PCL dispersed CNT (including both SWCNT and MWCNT), the CNT dispersants were spin coated onto glass cover slides, and the in vitro cytotoxicity was then assessed by a Live/Dead viability/cytotoxicity kit. This assay is based on the simultaneous determination of live and dead cells with fluorescence probes of calcein AM and EthD-1. In this test, calcein AM is well retained within live cells, producing an intense green fluorescence in live cells, while EthD-1 binds to nucleic acids of (lead cells, and produces a bright red fluorescence in dead cells. Neuroblastoma glioma (NG) cells with a concentration of $4 \times 10^4$ cells/well in a 6-well tissue culture plate were incubated with glass cover slides covered with P3HT-b-PCL dispersed CNTs at 37° C. for 72 hours. After washing the glass slides three times by phosphate-buffered saline to remove cells which were not attached to the glass slides, the slides were then incubated in a combined Live/Dead assay solution of calcein-AM (2 μM) and EthD-1 (4 μM) at 37° C. for 45 min.

The numbers of live and dead cells on the slides were determined on at least six randomly selected areas from three slides. As a control experiment, the cytotoxicity of P3HT homopolymer dispersed CNT and glass cover slide was also assessed. During the experiments, both P3HT dispersed and P3HT-b-PCL, dispersed MWCNTs were found to be hydrophobic and could not be wetted by the buffer solution containing NG cells. Only the cytotoxicity of P3HT-b-PCL functionalized SWCNTs (P3HT-b-PCL/SWCNT) was investigated. The NG cell was found to exhibit a high viability of more than 80% on the P3HT-b-PCL/SWCNT coated substrate, while the cell viability on glass substrates is about 43%, which means that the high viability is mainly contributed by P3HT-b-PCL/SWCNT and the sub-layer glass does not affect cytotoxicity study. In contrast, the cell viability on the P3HR/SWCNT coated substrate is tested to be 46%, which is much less than that on the P3HT-b-PCL/SWCNT coated substrate. The higher cell viability on the P3HT-b-PCL/SWCNT coated substrate results from the presence of biocompatible poly (∈-caprolactone) blocks on CNT surfaces which enhance the biocompatibility of CNTs.

EXAMPLES

The following non-limiting Examples serve to illustrate selected embodiments of the invention. It will be appreciated that variations in proportions and alternatives in elements of the components shown will be apparent to those skilled in the art and are within the scope of embodiments of the present invention.

Components for an Exemplary Block-Copolymer CNT Dispersion

Poly(3-hexylthiophene-block-polystyrene) (P3HT-b-PS), a diblock copolymer, was synthesized according to the procedure disclosed in Mihaela et al. *Polymer*, 2005, 46, 8582-8586, which is incorporated in its entirety herein, with the P3HT block having a 98% head-to-tail regioregularity. This block copolymer is readily soluble in chloroform, toluene, and tetrahydrofuran (THF). Gel permeation chromatography (GPC), measurement using polystyrene as a standard, indicates a number average molecular weight $M_n$ of 23000 dalton with a polydispersity of $M_w/M_n=1.3$. The composition of P3HT-b-PS was estimated to contain 34.1% and 65.9% (weight percentage) of P3HT and PS, respectively, according to $^1$H NMR spectral analysis. Homopolymer P31-HT used for comparison study was purchased from Aldrich ($M_n$=26000 and $M_w/M_n$=2.1 by GPC method with polystyrene standard). HiPco SWCNT was purchased from Carbon Nanotechnologies with a diameter of 0.8-1.2 nm and a length of 100-1,000 nm. The purity was reported to be >65%. MWCNTs were purchased from Nanolab with a diameter of 10-20 nm and a length of 5-20 μm, with a purity >95%. The CNTs were used as received without further purification or chemical modification.

Preparation of Exemplary Block Copolymer CNT Dispersions

CNTs were mixed with chloroform and P3HT-b-PS by sonification for 1 hour at a temperature of 18-20° C. maintained with a water bath. The minimum mass ratio of P3HT-b-PS to CNT's required to achieve a good dispersion was about 0.6 and 0.5 for SWCNT and MWCNT, respectively. The highest concentration of CNT dispersion achieved was about 2.5 mg/mL and 3.0 mg/mL for P3HT-b-PS/SWCNT (2:1, mass ratio) and P3HT-b-PS/MWCNT (1:1, mass ratio), respectively. Good dispersion of CNTs was also obtained with toluene and tetrahydrofuran (THF). The SWCNTs dispersion was more stable to centrifugation at 13,200 rpm for 30 minutes that was the dispersion of MWCNTs in the copolymer solution. The P3HT-b-PS/CNTs dispersions were dried and readily re-dispersed in chloroform, toluene, or THF upon gentle sonication for a few minutes. The dispersed solutions were stable for a period of a few months without any obvious precipitation.

Comparison of Dispersions Using Block Copolymers or Conjugated Homopolymer

Comparison studies of carbon nanotube dispersion in chloroform were conducted using homopolymer P3HT rather than the P3HT-b-PS block copolymer. Mass ratios of P3HT to CNTs, 0.65 and 0.6 for SWCNT and MWCNT, were required to achieve a good dispersion. As the P3HT-b-PS to CNT ratio was 0.6 and 0.5, and the weight fraction of the P3HT in the block copolymer was 0.341, the mass ratio of P3HT to CNTs for dispersion using P3HT-b-PS were 0.205 and 0.171 using SWCNT and MWCNT, respectively. Additionally, the P3HT/CNTs dispersions were not as stable as P3HT-b-PS dispersed CNTs as CNTs precipitation occurred in a few days.

TEM Analysis of P3HT-b-PS/CNT Cast from Dispersions

A dispersed CNT solution comprising MWCNTs was cast on TEM grids and analyzed by TEM, a depiction thereof being presented in FIG. 1(b), and briefly described above. As noted above, the vast majority (>90%) of MWCNTs were found to reside in the dispersions as isolated nanotubes. A high resolution TEM image of a MWCNT segment revealed the presence of a thin amorphous coating layer with a thickness of about 2 nm on the surface of the CNT wall, a depiction thereof being presented in FIG. 1(c), and briefly described above. This thin layer coating is consistent with P3HT-b-PS copolymer being assembled on the CNT surface. The interaction of the copolymer layer with the carbon nanotube surface appears to be very strong. After dispersion of carbon nanotubes in copolymer solution, the carbon nanotubes can be collected by centrifuge to remove free copolymers. The P3HT-b-PS/CNTs isolated by centrifugation were readily re-dispersed in chloroform, toluene or THF, indicating that the conjugated copolymer remained on the CNT surface even after multiple cycles of washing with solvent and centrifugation.

P3HT-b-PS/SWCNT Dispersions

For the SWCNT dispersion, two groups of tubular structures were discernable in the TEM obtained. One structure displayed an average diameter of about 5-6 nm and another structure displayed an average diameter of about 10-20 nm. The first structure having an average diameter of about 5-6 nm was the major component of the dispersion comprising at least 90% of the CNTs and appears to be completely de-bundled individual SWCNTs coated with the block copolymer as the diameter of the P3HT-b-PS/SWCNTs would be anticipated for a copolymer coating of about 2 mm, as observed by TEM for P3HT-b-PS/MWCNTs, on individual SWCNTs, which have a diameter of 0.8 to 1.2 in. The second P3HT-b-PS/SWCNTs structure occasionally found (<involving 10% of the CNTs) appears to result from SWCNTs that are not completely de-bundled.

Spectral Analysis of P3HT-b-PS Association with CNTs

Figure 2:
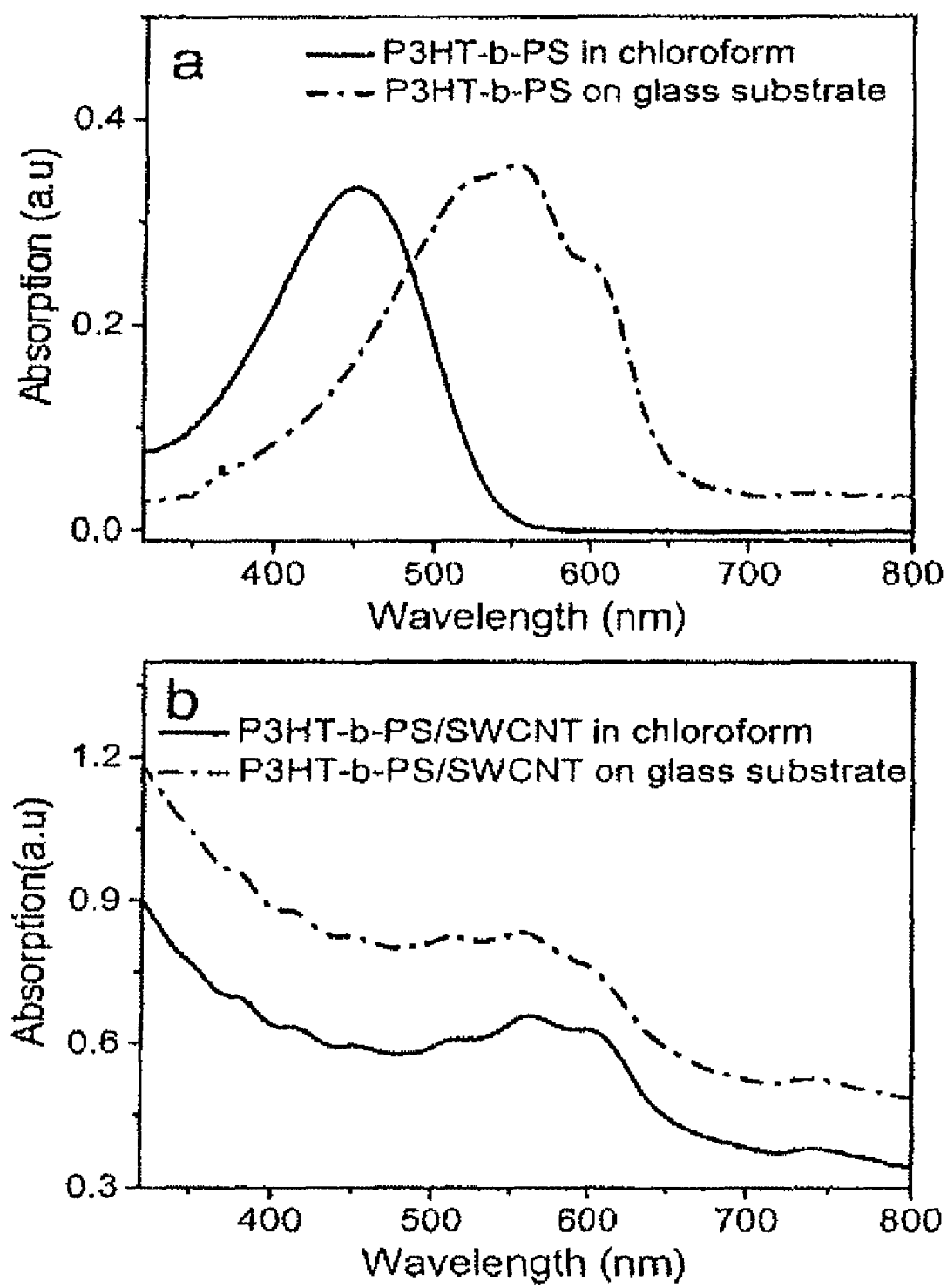
FIG. 2 are UV-Vis spectra of (a) P3HT-b-PS in chloroform as a cast film on a glass substrate; (b) P3HT-b-PS/SWCNT (2:1) in chloroform as a cast film on a glass substrate, according to various embodiments of the invention.

The interactions between the block copolymer and CNTs were studied by UV-Vis absorption and fluorescence spectroscopy. In dilute chloroform solution, P3HT-b-PS exhibits an absorption band centered at 454 nm, as shown in FIG. 2(a), which can be assigned to the regioregular P3HT block in the copolymer. When the P3HT-b-PS solution in chloroform was cast on a glass substrate, a dramatic red shift of the absorption band was observed from the dried film with the absorption band split into three peaks at 513, 560, and 604 nm, FIG. 2(a), as is consistent with such spectra from solid state regioregular P3HT. The red shift has been attributed to a better chain stacking in the solid state that increases the average conjugation length of the P3HT and decreases the band gap. These equivalent spectral features displayed by the block copolymer suggest that the solid state assembly structure of P3HT is not inhibited by the PS block.

The UV-Vis absorption spectrum of a P3HT-b-PS/SWCNT dispersion in chloroform, FIG. 2(b) also displays the three absorption peaks at 513, 560 and 604 nm differing from that of the solid P3HT-b-PS only in the intensities of these peaks. Therefore, it is believed that P3HT-b-PS polymer forms a similar conjugation length when associated with SWCNTs as that found in the solid state by P3HT. Referring to what was observed from TEM analysis, it appears that P3HT-b-PS polymers are deposited onto the surface of CNT walls, with P3HT moiety stacking on CNT in an ordered and condensed manner, and PS blocks are oriented towards the solution phase. The UV-V is spectrum of P3HT-b-PS/SWCNT from a cast film is quite similar to that in solution, again differing only in relative peak intensity. Therefore it appears that the interaction between the P3HT blocks with the CNTs is stable in solid state and that no rebundling of CNTs occurs upon evaporation of the solvent. The stability of this interaction appears to permit the repeated drying and redispersion of a P3HT-b-PS/CNT solution. A peak around 750 nm in the UV-Vis spectra of the P3HT-b-PS/SWCNT dispersion in chloroform and P3HT-b-PS/SWCNT solid film on a glass substrate is also observed. This peak is consistent with electron transfer from P3HT to SWCNT due to the SWCNT's high electron affinity, oxidizing the P3HT and reducing the SWCNTs.

Figure 3:
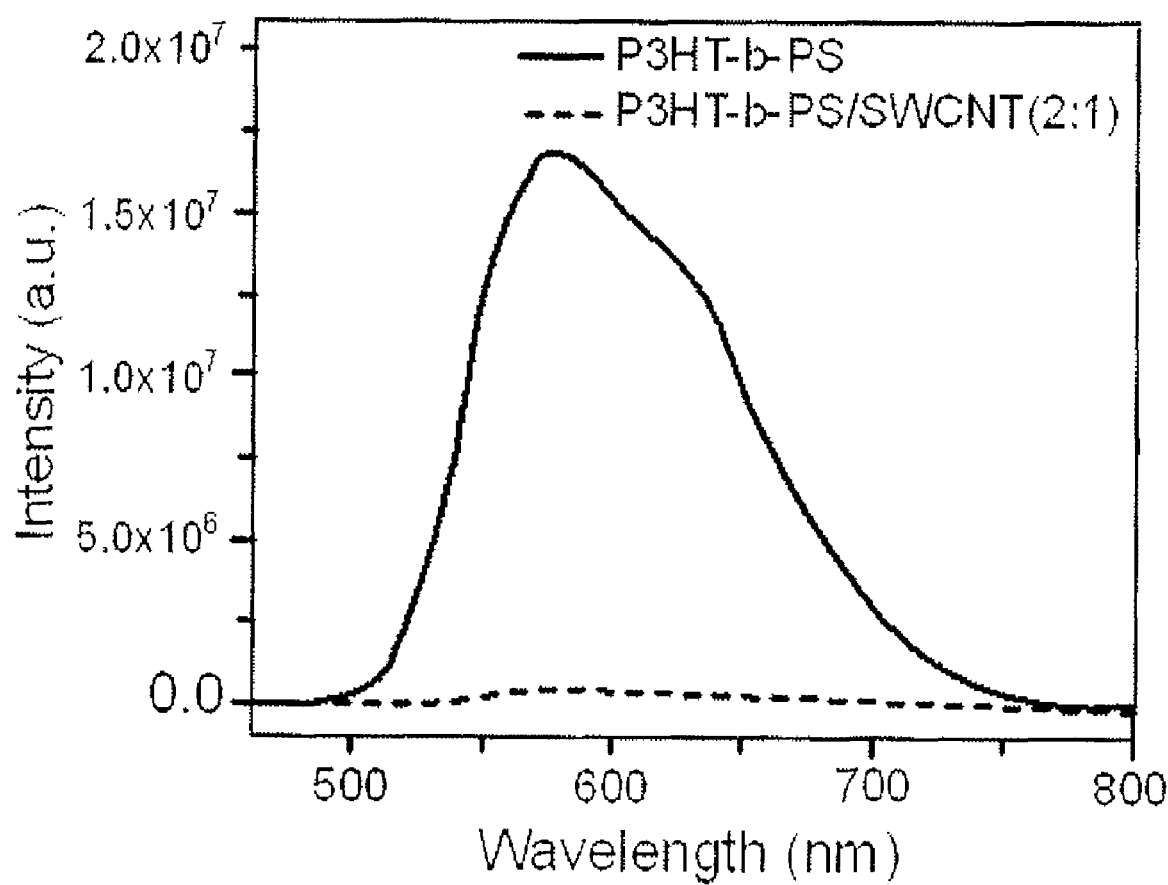
FIG. 3 are fluorescence spectra of pure P3HT-b-PS and P3HT-b-PS/SWCNTs (2:1) dispersion in chloroform, according to an embodiment of the invention.

Intimate interaction between P3HT-b-PS and CNTs is also indicated by the fluorescence quenching of P3HT-b-PS by CNTs due to electron transfers. Under UV-Vis irradiation, an exiton is generated on P3HT with an electron present in the highest occupied molecular orbit (HOMO 2.8 eV) and a hole in the lowest unoccupied molecular orbit (LOMO 4.9 eV), the electron in the HOMO transfers to the adjacent carbon nanotube rather than recombining with the hole. As shown in FIG. 3, P3HT-b-PS block copolymer exhibits a strong fluorescence emission at 575 nm. However after SWCNTs were dispersed in copolymer solution (2:1 mass ratio between P3HT-b-PS and SWCNTs), 97% of the fluorescence emission was quenched. Similar fluorescence quenching was also observed in MWCNT dispersions of the block copolymer. Comparison study of dispersing SWCNTs using P3HT showed only 75% of the fluorescence emission was quenched when the same P3HT to SWCNTs ratio as that which gave 97% quenching with the block copolymer was used, indicating a more efficient interaction of P3HT-b-PS with CNTs than between the CNTS and P3HT.

Polystyrene/CNT Composites

Using a 2:1 mass ratio P3HT-b-PS/SWCNT dispersion, polystyrene nanocomposites were fabricated with varied weight ratios of CNTs. The 2:1 P3HT-b-PS/SWCNT dispersions yielded nanocomposites that displayed the highest electrical conductivity of the nanocomposites prepared. Polystyrene nanocomposites using P3HT/SWCNT dispersions, with equivalent P3HT to SWCNT ratios were also prepared. Four point probe electrical conductivity of the nanocomposite thin films, with a thickness of about 30 μm prepared using a drawdown bar, was measured using a Keithley 2400 instrument. Percolation thresholds were obtained from the plots of conductivity versus SWCNT weight ratio as shown in FIG. 4. As described above, the percolation threshold corresponds to the lowest filler loading where a significant electrical conductivity increase is observed. The percolation threshold observed for a P3HT-b-PS/SWCNTs nanocomposite was 0.03% SWCNT with 0.06% P3HT-b-PS, which is significantly) lower than the value of 0.12% observed for a P3HT/SWCNT nanocomposite. The P3HT-b-PS dispersed SWCNT according to an embodiment of the invention was found to be stable in a PS-chloroform solution over several months of standing, while P3HT dispersed SWCNTs was found to precipitate out from the same PS solution in one day.

Superhydrophobic Surfaces

MWCNTs were mixed with block copolymer with varying (1:1 to 5:1) mass ratios of block copolymer to CNT. The mixtures were suspended in chloroform and sonicated for 1 hour at 18-20° C. with the temperature maintained using a water bath. Superhydrophobic surfaces were prepared by drop casting the dispersions at a concentration of 0.1-0.3 mg/ml, onto a substrate followed by drying of the cast films in a fume hood. The film thickness was determined to be about 1 μm using a profilometer (Dektak ST). The morphologies of films from east P3HT-b-PS/MWCNTs dispersions with different mass ratios were studied by scanning electron microscopy (SEM).

Figure 5:
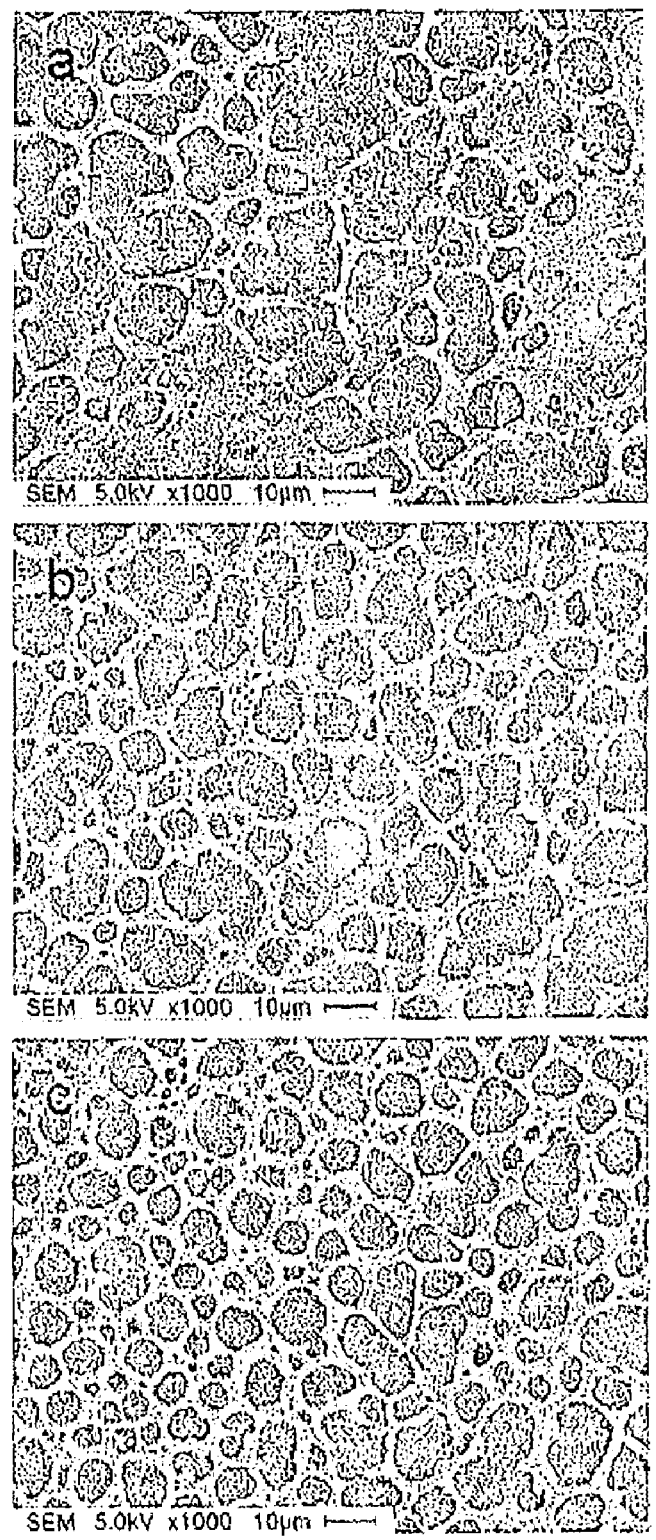
FIG. 5(a)-(c) are depictions derived from SEM images of P3HT-b-PS/MWCNTs composite films on glass substrates with a mass ratio of P3HT-b-PS to MWCNTs 0.5:1, 1:1 and 1.5:1, respectively, according to an embodiment of the invention.

As shown in depiction derived from a SEM image in FIG. 5(a), films from a low block copolymer to CNT ratio, such as 0.5:1, were found to display a cracked honeycomb structure with an irregular discontinuous wall. As shown in depiction derived from a SEM image in FIGS. 5(b) and 5(c), films with higher mass ratios of P3HT-b-PS to CNT, 1:1, and 1.5:1, respectively, were found to exhibit an intact more regular honeycomb structure of protruding features. At the higher mass ratios of block copolymer, the dark pore of the honeycombs becomes smaller and the protruding walls become thicker and rougher. The diameter of the honeycomb pores was found to range from about 2 to about 15 μm and the height of the honeycomb walls ranged from 200 to 500 nm. This honeycomb surface was found to display superhydrophobicity for films cast on a wide variety of substrates including glass, graphite, gold, paper, plastic, cellulose membranes, fabric, silicon wafers and aluminum foil.

Figure 6:
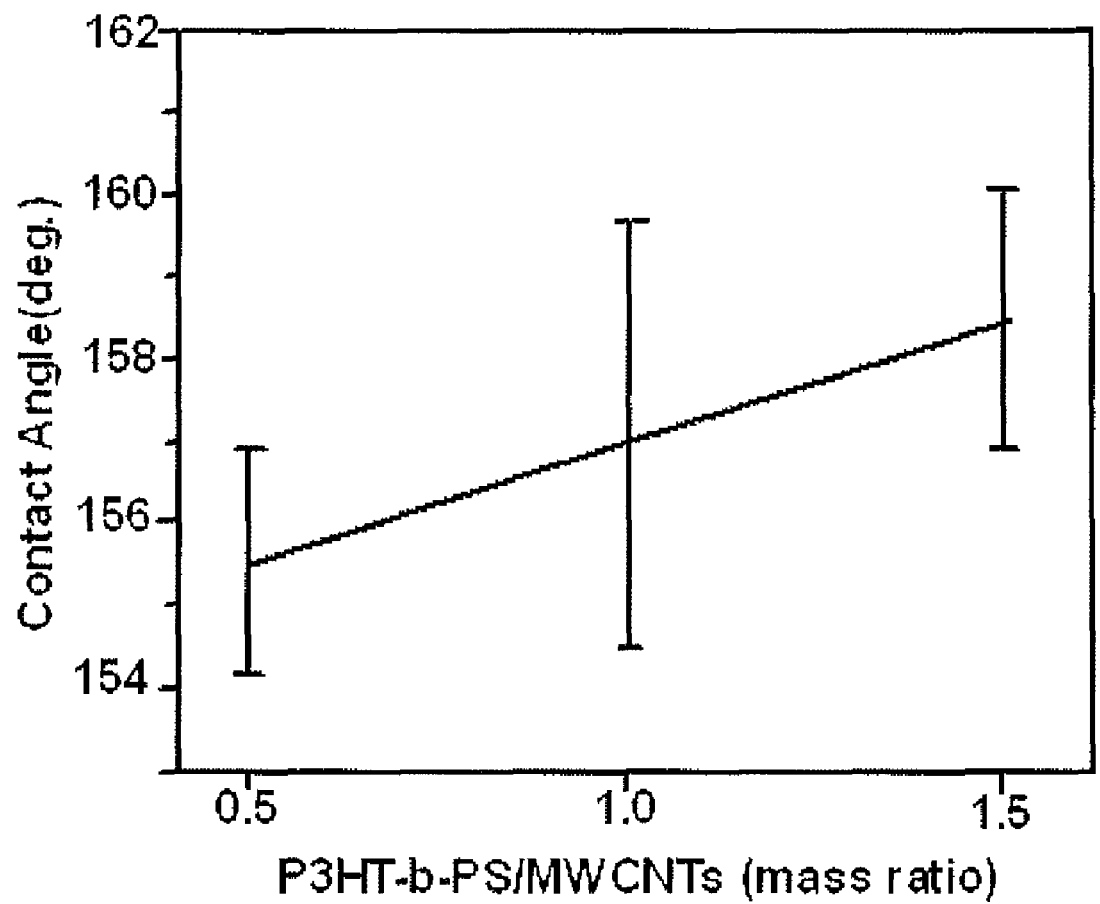
FIG. 6 shows a plot of the increase in the water contact angle with the increase of the mass ratios P3HT-b-PS to MWCNTs from 0.5:1 to 1.5:1, according to an embodiment of the invention.

Water placed on the surface of a superhydrophobic coating formed from P3HT-b-PS to MWCNT at a 1.5:1 mass ratio according to an embodiment of the invention, was found to form a bead. As the mass ratio of block copolymer increased over the range examined, the water contact angle on the honeycomb structured surface increased from 155.5±1.4° to 157.1±2.6 and to 158.6±1.4° as shown in FIG. 6.

Figure 7:
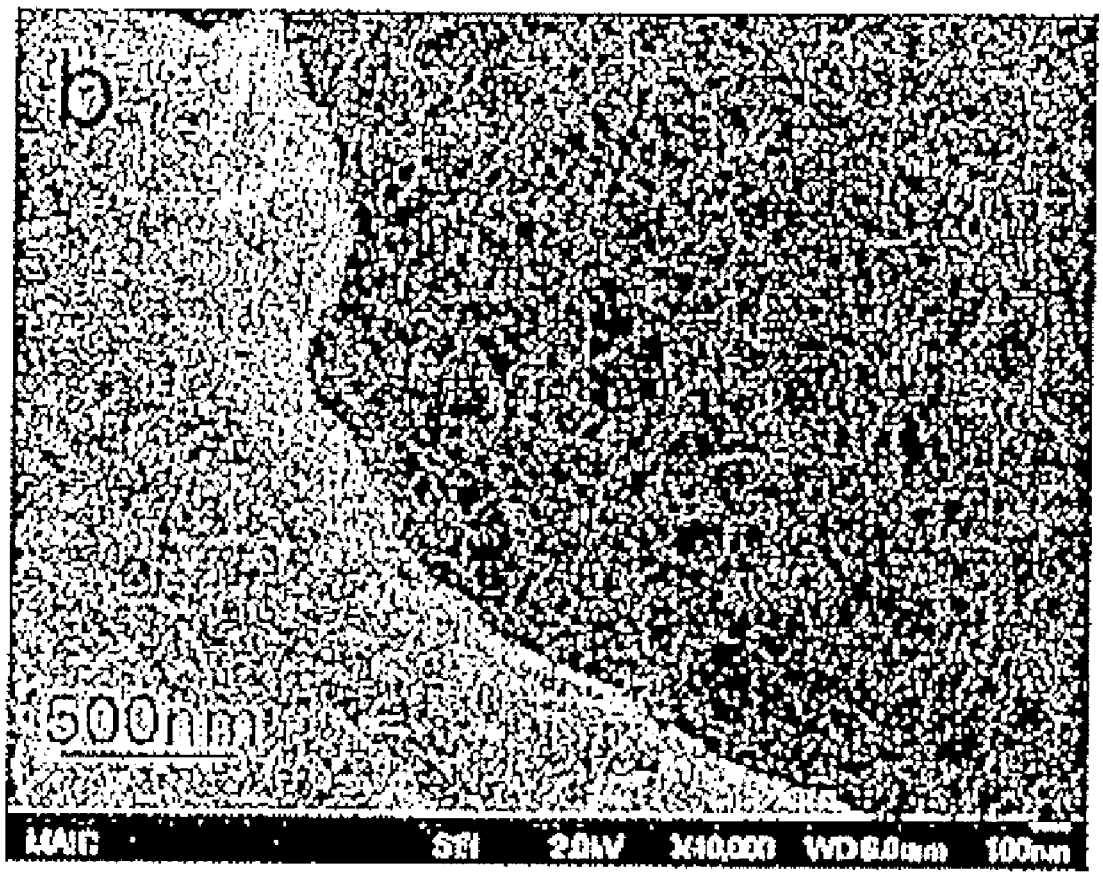
FIG. 7 shows a depiction derived from magnified SEM image of a honeycomb structure showing a P3HT-b-PS-rich wall and a MWCNT-rich base, according to an embodiment of the invention.

A depiction derived from a highly magnified SEM image obtained as shown in FIG. 7, reveals different morphology and compositions of the wall and the base of the protruding honeycomb structure. The protruding wall results from primarily P3HT-b-PS polymers decorated with a small amount of MWCNTs, while the main component in the base appears to be a randomly entangled carbon nanotube networks with nanoscale porosity which fulfills the requirements for a superhydrophobic surface. The phase separation morphology was further supported by fluorescence microscopic measurements. As described above, the block copolymer is fluorescent in both solution and solid state at around 575 nm, but this fluorescence is quenched when the block copolymer is in contact with CNTs. The honeycomb morphology of the film is observed in the fluorescence micrograph where the honeycomb walls fluoresce a bright green while the base remains dark. Hence, the honeycomb wall is block copolymer-rich comprising excess block copolymer that is not bound to carbon nanotubes. In the base area, block copolymer coated MWCNTs are the main component, as the area appeared to be dark due to the fluorescence quenching by the MWCNTs. The non-conjugated block of the block copolymer appears to play a key role in the honeycomb structure formation and the superhydrophobicity. When a dispersion of MWCNTs and homopolymer P3HT was cast on glass slides, no honeycomb structure was observed.

The stability of the superhydrophobic surface is important for most practical applications. The superhydrophobic films described above were found to remain superhydrophobic after being immersed in water for more than one week, or exposed in a high humidity environment for several months. Furthermore, the superhydrophobic coatings of the present invention are electrically conductive, with electrical conductivity for generally being in the range of 10-1,000 S/cm at 25° C., depending on the block copolymer and carbon nanotube composition. This conductivity range is appropriate for many applications such as electromagnetic interference shielding and electrostatic dissipation. The EMI shielding effectiveness of a P3HT-b-PS/MWCNT nanocomposite coating was measured to be around 28 dB at the X-band region. This P3HT-b-PS/MWCNT nanocomposite coating also exhibits fast gas sensing response to ammonia, acetic acid and organic vapors as observed from the drastic conductivity change of the films upon adsorption of the gaseous molecules. Such superhydrophobic coatings according to embodiments of the invention, may also be used for corrosion protection of a wide range of metal materials. The charge transfer formation between the carbon nanotubes and conjugated block copolymers is another interesting property that may be useful for photovoltaic cell applications.

Biocompatible CNTs Via Non-Chemical Surface Functionalization

HiPco SWCNT was purchased from Carbon Nanotechnologies with a diameter of 0.8-1.2 nm and a length of 100-1000 nm. The purity was declared to be above 65%. MWCNTs were purchased from Nanolab with a diameter of 10-20 nm and a length of 5-20 μm, with the purity above 95%. The as-received CNTs were used directly without further purification or chemical modification. All the dispersing of CNTs by conjugated block copolymers used chloroform as solvents except the P3HT-b-PAA/CNT dispersion which was dispersed in THF. The concentration of CNTs was fixed to be 1 mg/mL, and the weight ratio between CNTs and conjugated block copolymers was tuned so that the weight ratio between CNTs and P3HT block was fixed to be 1:0.5 and 1:0.7 for MWCNT and SWCNT, respectively. After mixing the copolymers and CNTs in solvent, 30 mins sonication was applied to obtain the CNT dispersion. The CNT/PMMA composites were prepared by simply mixing different weight ratio of dispersed SWCNT and the PMMA chloroform solution (10 wt. %), after thoroughly mixed for 1 hour by stirring, the composite thin films (~30 μm) were cast on glass substrates by a drawdown bar. The electrical conductivity of the films was measured by a standard four probe method using Keithley 6517A. Optical images of the composite films before and after annealing were taken by an Olympus BX51 system. The TEM images of P3HT-b-PAA dispersed MWCNT were taken by an FEI TECNAI F30. The density of carboxylic groups of P3HT-b-PAA dispersed MWCNT was characterized by titration with $10^{-5}$ mmol NaOH solution using phenolphthalein as the indicator. UV-Vis measurements of P3HT-b-PPEGA dispersed MWCNT in different solvent were performed using a Cary 300 UV-Visible spectrophotometer. The in vitro cytotoxicity of P3HT-b-PCL dispersed CNTs was assessed by a Live/Dead viability/cytotoxicity kit, and a fluorescence microscope (Olympus BX51) was used to count the viability of NG cells.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A carbon nanotube comprising dispersion, comprising:
   a block copolymer comprising at least one block of a conjugated polymer and at least one block of a non-conjugated polymer;
   at least one solvent for dissolving said block copolymer to form a solution; and
   a plurality of non-chemically modified carbon nanotubes dispersed in said solution,
   wherein a weight % of said non-conjugated polymer exceeds a weight % of said conjugated polymer, and
   wherein at 25° C. exclusive of any mechanical force and after one hour, at least 90% of said plurality of carbon nanotubes exist in said dispersion as isolated carbon nanotubes.

2. The dispersion of claim 1, wherein said block copolymer is a diblock copolymer, triblock copolymer, multiblock copolymer or a graft copolymer wherein at least one conjugated block is grafted on a non-conjugated polymer or at least one non-conjugated block is grafted on a conjugated polymer.

3. The dispersion of claim 1, wherein said conjugated polymer comprises polythiophene, polypyrrole, polydioxythiophene, polydioxypyrrole, polyfluorene, polycarbazole, polyfuran, polydioxyfuran, polyacetylene, poly(phenylene), poly(phenylene-vinylene), poly(arylene ethynylene), polyaniline, polypyridine, any substituted variation thereof, or any copolymer thereof.

4. The dispersion of claim 1, wherein said non-conjugated polymer comprises polyacrylates, polymethacrylates, polydienes, polyalkyleneoxides, polyvinylethers, polyalkylenes, polyesters, polycarbonates, polyamides, polyurethanes, polyvinylpyrrolindone, polyvinylpyridine, or polysiloxanes.

5. The dispersion of claim 1, wherein said solvent is an organic solvent or an aqueous solvent.

6. The dispersion of claim 1, wherein said block copolymer comprises poly(3-hexylthiophene-block-polystyrene) and said solvent comprises chloroform, toluene, or tetrahydrofuran.

7. The dispersion of claim 1, wherein said non-conjugated polymer includes at least one functional group that upon drying said dispersion associates to a surface of said plurality of carbon nanotubes, without covalent bonding thereto.

8. The dispersion of claim 7, wherein said non-conjugated polymer comprises a biocompatible polymer.

9. The dispersion of claim 7, wherein said non-conjugated polymer comprises an amphiphilic non-conjugated polymer.

10. A carbon nanotube polymer composite, comprising:
a plurality of non-chemically modified carbon nanotubes;
a block copolymer comprising at least one block of a conjugated polymer and at least one block of a non-conjugated polymer;
wherein a weight % of said non-conjugated polymer exceeds a weight % of said conjugated polymer, and
wherein said carbon nanotube polymer composite comprises at least 0.05 weight % of said plurality of carbon nanotubes, and a percolation threshold of said carbon nanotube polymer composite is less than 0.1 weight % of said plurality of carbon nanotubes.

11. The composite of claim 10, wherein said conjugated polymer comprises polythiophene, polypyrrole, polydioxythiophene, polydioxypyrrole, polyfluorene, polycarbazole, polyfuran, polydioxyfuran, polyacetylene, poly(phenylene), poly(phenylene-vinylene), poly(arylene ethynylene), polyaniline, polypyridine, any substituted variation thereof, or any copolymer thereof.

12. The composite of claim 10, wherein said non-conjugated polymer comprises polyacrylates, polymethacrylates, polydienes, polyalkyleneoxides, polyvinylethers, polyalkylenes, polyesters, polycarbonates, polyamides, polyurethanes, polyvinylpyrrolindone, polyvinylpyridine, or polysiloxanes.

13. The composite of claim 10, wherein said non-conjugated polymer includes at least one functional group that associates to a surface of said plurality of carbon nanotubes, without covalent bonding thereto.

14. The composite of claim 13, wherein said non-conjugated polymer comprises a biocompatible polymer.

15. The composite of claim 13, wherein said non-conjugated polymer comprises an amphiphilic non-conjugated polymer.

16. The composite of claim 10, wherein said block copolymer comprises poly(3-hexylthiophene)-block-polystyrene).

17. The composite of claim 16, wherein said composite comprises a superhydrophobic coating that is positioned on a substrate surface, wherein a base portion of said superhydrophobic coating comprises primarily (by weight) said plurality of carbon nanotubes and a top portion of said superhydrophobic coating comprises features comprising primarily (by weight) said block copolymer.

18. A method of forming carbon nanotube polymer composites, comprising the steps of:
providing a dispersion comprising a block copolymer comprising at least one block of a conjugated polymer and at least one block of a non-conjugated polymer, wherein a weight % of said non-conjugated polymer exceeds a weight % of said conjugated polymer, and a solvent for said block copolymer to form a solution, a plurality of non-chemically modified carbon nanotubes dispersed in said solution, wherein at 25° C. exclusive of any mechanical force and after one hour, at least 90% of said plurality of carbon nanotubes exist in said dispersion as isolated nanotubes; and
evaporating said solvent from said dispersion to yield a carbon nanotube polymer composite.

19. The method of claim 18, wherein said conjugated polymer comprises poly(3-hexylthiophene), and said method further comprises casting said dispersion on a substrate surface before said evaporating, wherein said composite comprises a superhydrophobic coating on said substrate, wherein a base portion of said superhydrophobic coating comprises primarily (by weight) said plurality of carbon nanotubes and a top portion of said superhydrophobic coating comprises features comprising primarily (by weight) said block copolymer.

20. The method of claim 18, wherein said non-conjugated polymer includes at least one functional group that upon removal of said solvent to dry said dispersion associates to a surface of said plurality of carbon nanotubes, without covalent bonding thereto.

21. The method of claim 20, wherein said non-conjugated polymer comprises a biocompatible polymer.

22. The method of claim 20, wherein said non-conjugated polymer comprises an amphiphilic non-conjugated polymer.

* * * * *